United States Patent [19]

Abiven

[11] Patent Number: 4,961,221
[45] Date of Patent: Oct. 2, 1990

[54] COMMUNICATION METHOD AND SYSTEM WITH ENCRYPTION OF INFORMATION

[75] Inventor: Jacques Abiven, Plouaret, France

[73] Assignee: L'Etat Francais represente par le Ministre des Poste, Telecommunications et de l'Espace (Centre National d'Etudes des Telecommunications, Issy-les-Moulineaux, France

[21] Appl. No.: 449,218

[22] Filed: Dec. 12, 1989

[30] Foreign Application Priority Data

Dec. 14, 1988 [FR] France ............................ 88 16467

[51] Int. Cl.$^5$ .................. H04K 1/06; H04T 3/00; H04L 5/14; H04B 9/00
[52] U.S. Cl. .................................... 380/21; 380/2; 380/44; 380/50; 340/825.07; 364/242.95
[58] Field of Search ............... 380/21, 2, 44, 50; 340/825.07, 825.52; 364/242.95

[56] References Cited

U.S. PATENT DOCUMENTS 4,805,216  2/1989  Gruenberg ........................ 380/21
4,809,327  2/1989  Shima ............................. 380/21

*Primary Examiner*—Thomas H. Tarcza
*Assistant Examiner*—David Cain
*Attorney, Agent, or Firm*—Lowe, Price, LeBlanc, Becker & Shur

[57] ABSTRACT

An information encryption method particularly intended for a communication system in which bidirectional multiplexed communications of the point-to-multipoint type are derived between a switching exchange and plural terminal stations. The switching exchange transmits first multiplexed words respectively destined for the terminal stations. The terminal stations supply second words which are multiplexed and transmitted towards the switching exchange. In the switching exchange, informations concerning transmission errors detected in the second words are derived and transmitted towards the terminal stations, and the first words are encrypted as a function of second words previously received free of transmission error in the switching exchange. In each of the terminal stations, the informations concerning the transmission errors are detected, and the second words transmitted from the terminal station and received free of transmission error by the switching exchange are memorized. The first words received are decrypted in the terminal station as a function of transmission errors and the memorized second words.

5 Claims, 2 Drawing Sheets

COMMUNICATION METHOD AND SYSTEM WITH ENCRYPTION OF INFORMATION

BACKGROUND OF THE INVENTION

1. Field of the Invention.

This invention relates in general to the problem of the secrecy of information in communication system in which plural terminal installations receive multiplexed data signal frames and are likely to read in said data signal frames which are not intended for them. More particularly, this invention relates to the encryption of time-division multiplexed bidirectional communications via optical fibers in a telecommunication network e.g. of the ISDN (Integrated Services Digital Network) type.

2. State of the Prior Art.

In an optical fiber telecommunication network, the local servicing of communication signals between a local switching exchange and subscriber installations is carried out by means of a starred service network comprising several transmission optical fibers connecting the switching exchange and the subscriber installations respectively at different ports of a directional optical fiber coupler constituting the central node of the starred service network. Communication between the switching exchange and the subscriber installations is of the collective half-duplex type. During first communication periods, the switching exchange transmits a backward packet towards all the subscriber installations. The backward packet is comprised of plural multiplexed words respectively destined for the subscriber installations. During second communication periods, the subscriber installations transmit words destined for the switching exchange respectively at different determined times. At level of the service network central node, the words transmitted by the subscriber installations are inserted in respective time intervals of a forward packet destined for the switching exchange.

With this type service network there is a problem of secrecy of information in the backward transmission direction from the switching exchange toward the subscriber installations. In fact, each of the subscriber installations receives the entire backward packet and is likely to read in said packet, words that are destined for other installations. In the forward transmission direction from the subscriber installations to the switching exchange, there is no secrecy problem due to the fact that the optical fiber coupler at the center of the network is of the directional type and that a word transmitted by a subscriber installation towards the switching exchange is only received by the latter and may not be received by other installations.

OBJECT OF THE INVENTION

The main object of this invention is to solve the problem of secrecy of information set forth above in the particular context of an optical fiber and collective half-duplex service local area network but which is also suitable in general for all communication networks carrying bidirectional multiplexed communications of the point-to-multipoint type.

SUMMARY OF THE INVENTION

Accordingly, there is provided a method embodying the invention for encrypting information in a communication system in which bidirectional multiplexed communications of the point-to-multipoint type are derived between a central station and plural terminal stations. The switching exchange transmits first multiplexed words respectively destined for the terminal stations. The terminal stations respectively supply second words which are multiplexed and transmitted towards the central station.

In the central station, transmission errors are detected in the second words thereby deriving transmission error informations that are transmitted towards the terminal stations. The first words are encrypted respectively as a function of corresponding second words previously received in the central station free of transmission error.

In each of the terminal stations, the transmission error informations are detected. The second words transmitted by the terminal station and received free of transmission error are temporarily memorized. The respective first words received by the terminal station are decrypted as a function of the detected transmission error informations and the memorized second words.

The invention also provides a communication system with encryption. In this system, the central station and the terminal stations are connected via bidirectional transmission media, such as optical fibers, and exchange therebetween communications of point-to-multipoint type. The central station and the terminal stations are respectively fitted with an encrypting device and decrypting devices implementing the method embodying the invention.

BRIEF DESCRIPTION OF THE DRAWING

Further features and advantages of the invention will be apparent from the following particular description of the method and of several preferred embodiments of communication systems embodying the invention as illustrated in the corresponding accompanying drawings in which.

DESCRIPTION OF THE PREFERRED EMBODIMENTS

Figure 1:
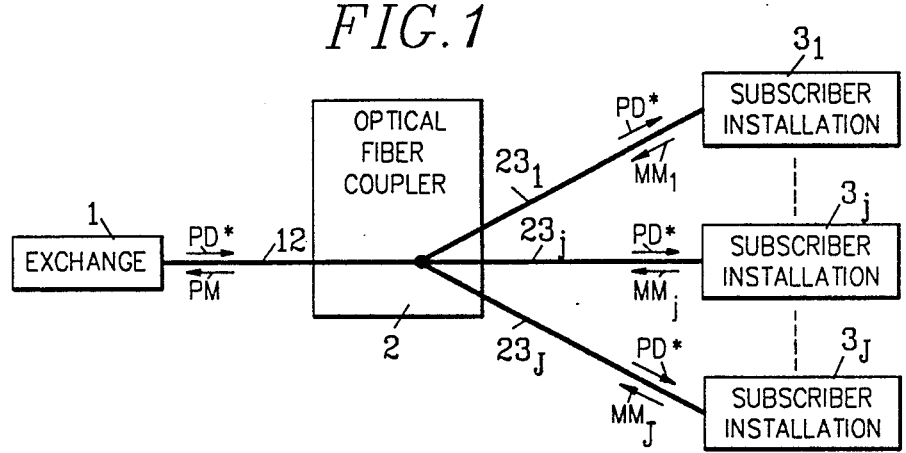
FIG. 1 schematically shows the architecture of a communication system embodying the invention comprised of an optical fiber and collective half-duplex starred communication network.

In reference to FIG. 1, a communication system with encryption of information embodying the invention is comprised by an optical fiber collective half-duplex communication network of the star-structure type. The communication network comprises a central transmission-reception station, such as a switching exchange 1 connected to plural terminal transmission-reception stations such as $J=12$ subscriber installations $3_1$ to $3_j$, via a directional of optical fiber coupler 2. Coupler 2 has a first port connected to the switching exchange 1 through an optical fiber 12, and $J=12$ second ports respectively connected to the $J=12$ subscriber installations $3_1$ to $3_j$ through $J=12$ optical fibers $23_1$ to $23_j$.

Packets are transmitted in collective half-duplex mode between the switching exchange 1 and the subscriber installations $3_1$ to $3_j$. During first periods of communication, the switching exchange 1 transmits encrypted backward packets PD* which are received by all the subscriber installations $3_1$ to $3_J$. During second periods of communication, the subscriber installations $3_1$ to $3_J$ respectively transmit forward data words $MM_j$ destined for the switching exchange 1, whereby j is an index lying between 1 and J.

According to the invention, the data words $MM_j$ are transmitted in clear and are not encrypted due to the fact that the coupler 2 is of the directional type and that a word $MM_j$ transmitted by the installation $3_j$ is only received by the switching exchange 1.

At the level of the coupler 2 comprising the center of the starred network, the different words $MM_j$ transmitted by the subscriber installations respectively coincide with different time intervals and form a forward packet PM which is carried up to the switching exchange 1 via the optical fiber 12. The first and second periods of the communication are alternated and during each period a single packet is transmitted.

Figure 2A:
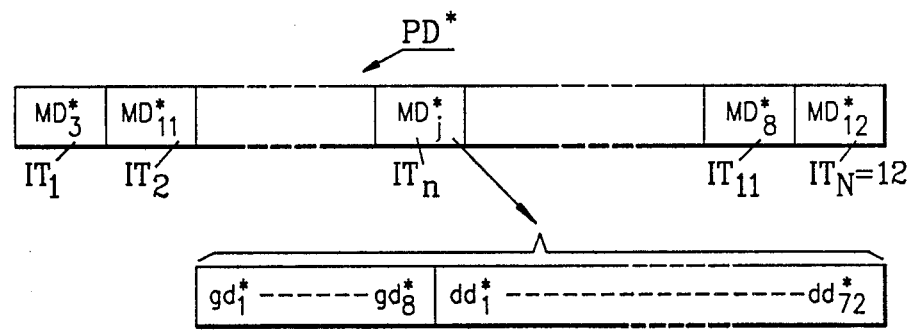
FIGS. 2A and 2B respectively show diagrams of forward and backward packets exchanged between a switching exchange and subscriber installations included in the communication system shown in FIG. 2; and, FIG. 3 shows encrypting and decrypting circuits respectively included in the switching exchange and the subscriber installations of the communication system.
Figure 2B:
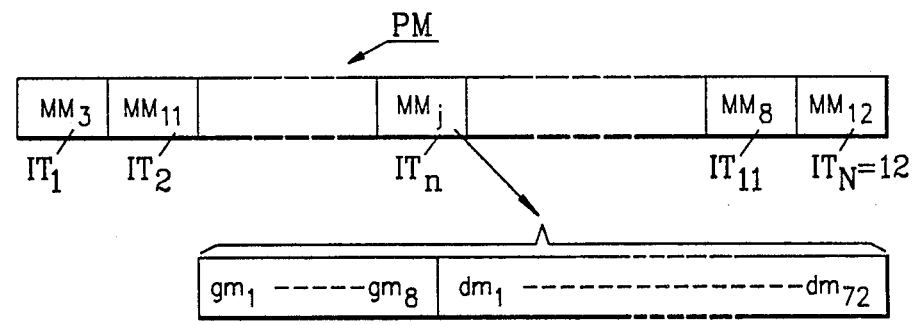

The structures of the backward and forward packets packet PD* and PM are respectively shown in FIGS. 2A and 2B.

As shown in FIG. 2A, a backward packet PD* comprises $N = J = 12$ word time intervals $IT_1$ to $IT_{N=12}$ of identical duration. The time intervals $IT_1$ to $IT_n$ contain encrypted data words $MD^*_j$ specifically destined for the subscriber installations $3_1$ to $3_J$. The time intervals $IT_1$ to $IT_N$ are e.g. attributed by the switching exchange 1 to the subscriber installations $3_1$ to $3_j$ as a function of the order of connection of the installations. To a connected subscriber installation $3_j$ is attributed a time interval $IT_n$ of which the index n lying between 1 and $N = J = 12$ denotes a connection rank of the installation $3_j$.

As also shown in FIG. 2A, a data word $MD^*_j$ is comprised of one control octet and nine data octets, i.e. of 8 control bits $gd^*_1$ to $gd^*_8$ and 72 data bits $dd^*_1$ and $dd^*_{72}$. The control bits $gd^*_1$ are not encrypted as a function of variable informations known to the switching exchange 1 and to the addressee subscriber installation $3_j$. The control bits are preferably encoded in a redundant code, thereby authorizing detection and correction of transmission errors in the subscriber installations. Moreover, according to the invention, a information used for the decryption of words $MD^*_j$ received by the subscriber installations is also carried by the control bits $gd^*_1$ to $gd^*_8$.

Like a backward packet PD*, a forward packet PM, as shown in FIG. 2B, comprises $N = J = 12$ word time intervals $IT_1$ to $IT_{N=12}$ of identical duration. The time intervals $IT_1$ to $IT_N$ of a packet PM contain data words $MM_j$ destined for the switching exchange 1. The data words $MD_j$ and $MM_j$ respectively occupy time intervals $IT_N$ having the same rank n in the packets PD* and PM.

Like a backward data word $MD^*_j$, a forward data word $MM_j$ is comprised of one control octet and nine data octets, i.e. of 8 control bits $gm_1$ to $gm_8$ and 72 data bits $dm^*_1$ to $dm^*_{72}$. Like the control bits $gd^*_1$ to $gd^*_8$, the control bits $gm_1$ to $gm_8$ are encoded in a redundant code, thereby authorizing detection and correction of transmission errors in the switching exchange 1.

Figure 3:
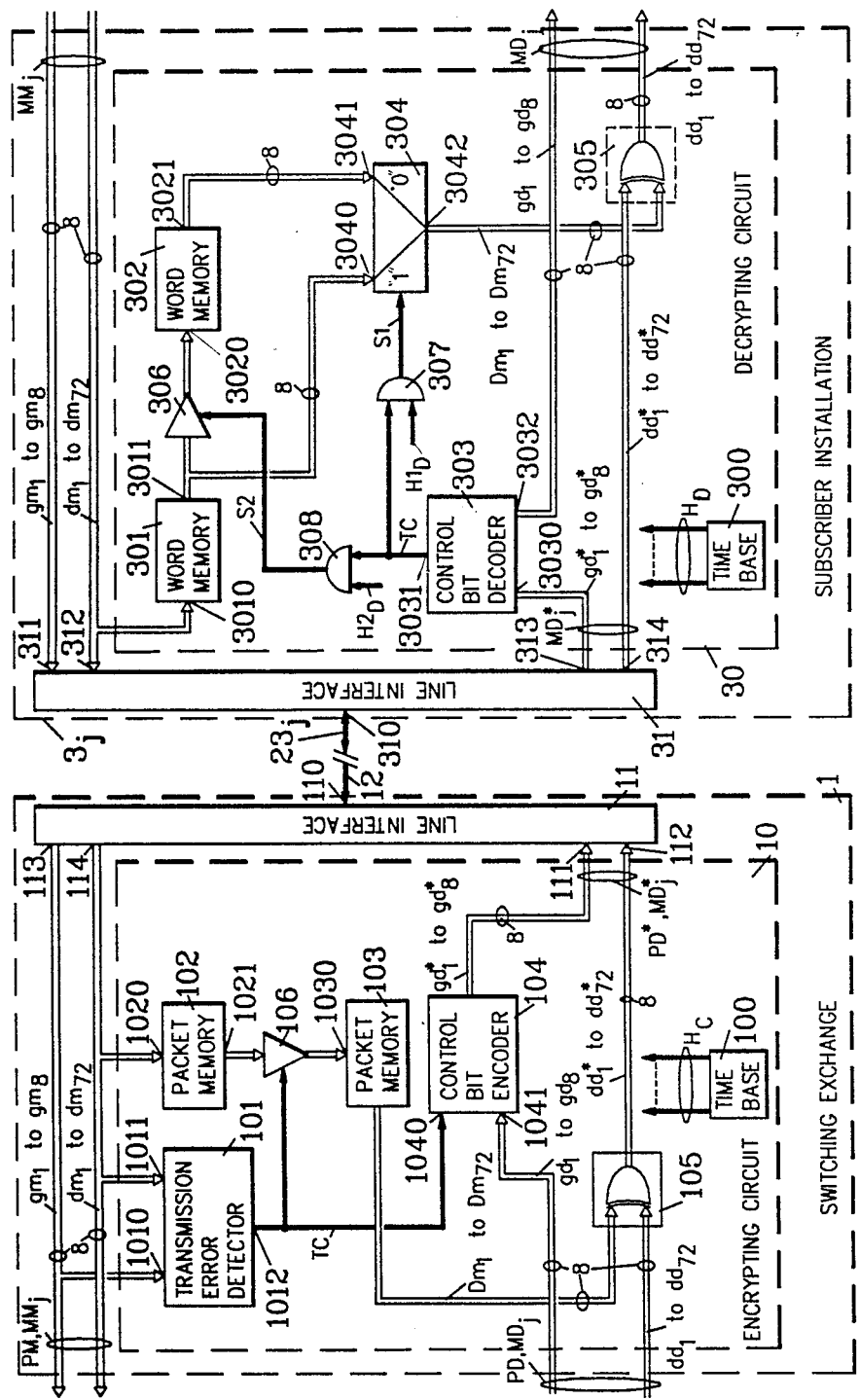

In reference to FIG. 3 are now described an encrypting circuit 10 and a decrypting circuit 30 respectively included in the switching exchange 1 and in a subscriber installation $3_j$.

As shown on the left of FIG. 3, the switching exchange 1 is fitted with a line interface 11 connected to the optical fiber 12 and to the encrypting circuit 10. An optical port 110 of the interface 11 is connected to the optical fiber 12. First and second electrical input ports 111 and 112 of the interface 11 respectively receive octet by octet the control bits $gd^*_1$ to $gd^*_8$ and the data bits $dd^*_1$ to $dd^*_{72}$ of a backward packet PD* to be transmitted to the subscriber installations during a first communication period. First and second electrical output ports 113 and 114 of the interface 11 respectively issue octet by octet the control bits $gm_1$ to $gm_8$ and the data bits $dm_1$ to $dm_{72}$ contained in a forward packet PM received during a second communication period.

The encrypting circuit 10 comprises essentially a time base 100, a transmission error detector 101, first and second packet memories 102 and 103, a control bit encoder 104, and an EXCLUSIVE-OR gate circuit 105.

The time base 100 derives several clock and timing signals $H_c$ which are supplied to the members 101 to 104 in the encrypting circuit 10 so as to control and synchronize their functioning.

The transmission error detector 101 is a conventional circuit of the cycle redundancy check type (CRC4). The detector 101 comprises first and second input ports 1010 and 1011 which are respectively connected to the first and second output ports 113 and 114 of the interface 11 so as to receive the control bits and data bits in a forward packet PM. The detector 101 carries out a redundancy calculation from the data bits $dd_1$ to $dd_{72}$ received and compares the result of this calculation with a corresponding information which is carried by the control bits $gm_1$ to $gm_8$ and which indicates the result at which the redundancy calculation should arrive in the case of a packet PM received free of transmission error. Via an output 1012, the detector 101 supplies a logic signal TC that is at state "1" to indicate an error-free reception of the packet PM. The signal TC is applied at a control input of a buffer amplifier 106 of the three-state type.

The first and second packet memories 102 and 103 are analogous. Each of the memories 102 and 103 comprises $9 \times J = 108$ memory cells of one octet each that are destined to respectively memorize the $9 \times J = 108$ forward packet data octets PM.

The purpose of the first memory 102 is to memorize the data octets of the packet PM being received. The first memory comprises an input port 1020 connected to the second output port 114 of the interface 11 so as to receive the data bits $dm_1$ to $dm_{72}$ octet by octet as they are transmitted by the interface 11 and to load them in the memory cells. An output port 1021 of the first memory 102 is connected to an input port 1030 of the second memory 103 via the buffer amplifier 106.

At the end of the transmission of the packet PM being carried out by the interface 11, in the event of no transmission errors being detected by the detector 101, the detector 101 transmits the signal TC="1" which activates the buffer amplifier 106, and the content of the first memory 102 is transferred at a fast rate towards the second memory 103. The second memory 103 thus comprises at all times the data bits $dm_1$ to $dm_{72}$ of the last forward packet PM received free of transmission error. The data bits memorized in the memory 103 are denoted by $Dm_1$ to $Dm_{72}$.

The control bit encoder 104 produces the control bits $gd^*_1$ to $gd^*_8$ of the backward packet PD* as a function of the signal TC and of the control bits $gd_1$ to $gd_8$ included in a corresponding backward packet PD supplied in clear by the switching exchange 1 for encryption into the packet PD* and transmission towards the subscriber installations. The encoder 104 receives at an input 1040 and at an input port 1041 respectively the signal TC and the control bits $gd_1$ to $gd_8$. The control bits $gd^*_1$ to $gd^*_8$ are applied by the encoder 104 to the first input port 111 of the interface 11. In encoded form, the control bits $gd^*_1$ to $gd^*_8$ carry the informations supplied by the signal TC.

The circuit 105 with EXCLUSIVE-OR gates is schematically shown in FIG. 3 by a single EXCLUSIVE-OR gate for the purposes of convenience. The circuit 105 in fact comprises eight parallel 2-input EXCLUSIVE-OR gates to encrypt octet by octet the data bit octets $dd_1$ to $dd_{72}$ as a function of the corresponding data bit octets $Dm_1$ to $Dm_{72}$. The data bits $dd_1$ to $dd_{72}$ are applied to first inputs of circuit 105. The data bits $Dm_1$ to $Dm_{72}$ are applied to second inputs of circuit 105. Circuit 105 feds at output the encrypted data bits $dd^*_1 = dd_1 \oplus Dm_1$ $dd^*_{72} = dd_{72} \oplus Dm_{72}$, whereby the symbol $\oplus$ denotes the EXCLUSIVE-OR logic operation.

As shown on the right in FIG. 3, the subscriber installation $3_j$ is fitted with a the line interface 31. An optical port 310 of the interface 31 is connected to the optical fiber $23_j$. First and second electrical input ports 311 and 312 of the interface 31 respectively receive octet by octet the control bits $gm_1$ to $gm_8$ and the data bits $dm_1$ to $dm_{72}$ of a forward packet word $MM_j$ to be transmitted towards the switching exchange 1 during a second communication period. First and second electrical output ports 313 and 314 of the interface 31 respectively fed octet by octet the control bits $gd^*_1$ to $gd^*_8$ and the data bits $dd^*_1$ to $dd^*_{72}$ in an encrypted backward packet $PD^*$ received during a first communication period.

The decrypting circuit 30 essentially comprises a time base 300, first and second word memories 301 and 302, a control bit decoder 303, a multiplexer 304, and an EXCLUSIVE-OR gate circuit 305.

The time base 300 produces several clock and timing signals $H_D$ which are supplied to the members 301 to 304 in the decrypting circuit 30 so as to control and synchronize their functioning.

The first and second word memories 301 and 302 are analogous. Each of the memories 301 and 302 comprises 9 memory cells of one octet each which are destined to memorize octet by octet the date bits $dm_1$ to $Dm_{72}$ of forward words $MM_j$.

The purpose of the first memory 301 is to memorize the data bits $dm_1$ to $dm_{72}$ of the last forward word $MM_j$ transmitted by the subscriber installation $3_j$. The memory 301 comprises an input port 3010 connected to the second input port 312 of the interface 31 so as to receive and load into the memory the octets of data bits $dm_1$ to $dm_{72}$ as the octets are supplied to the port 312. At the end of transmission of a forward word $MM_j$, all the data bits $dm_1$ to $dm_{72}$ of the word are memorized in the memory 301. The memory 301 comprises an output port 3011 connected to a first input port 3040 of the multiplexer 304.

The purpose of the second memory 302 is to memorize the data bits $dm_1$ to $dm_{72}$ of the last word $MM_j$ transmitted by the subscriber installation $3_j$ and received free of transmission error by the switching exchange 1. The memory 302 comprises an input port 3020 connected to the output port 3011 of the memory 301 via a buffer amplifier 306 of the three-state type. An output port 3021 of the memory 302 is connected to a second input port 3041 of the multiplexer 304.

The control bit decoder 303 carries out a decoding operation that is the reverse of the encoding carried out by the encoder 104, and its purpose is to restore the control bits $gd_1$ to $gd_8$ and the signal TC from the encoded control bits $gd^*_1$ to $gd^*_8$ in the backward word $MD^*_j$ received. An input port 3030 of the decoder 303 is connected to the first output port 313 of the interface 31 for receiving the control bits $gd^*_1$ to $gd^*_8$. Decoder 303 feds the signal TC and the control bits $gd_1$ to $gd_8$ respectively from an output 3031 and an output port 3032.

The signal TC is applied to first inputs of two 2-input AND gates 307 and 308. Second inputs of the gates 307 and 308 respectively receive clock signals $H1_D$ and $H2_D$ supplied by the time base 300. Outputs of the gates 307 and 308 respectively supply control signals S1 and S2. The signals S1 and S2 are applied to control inputs of the multiplexer 304 and the buffer amplifier 306 respectively.

During reception of a backward word $MD^*_j$ in the decrypting circuit 30, the clock signals $H1_D$ and $H2_D$ are respectively in the state "1" and in the state "0". The gates 307 and 308 are then respectively open and closed. In the case of the signal TC being in the state "1", the first input gate 3040 of the multiplexer 304 is selected by the signal S1 and the multiplexer 304 issues the content of the first memory 301 octet by octet via an output port 3042. Since TC="1", the memory 301 then contains the data bits $Dm_1$ to $Dm_{72}$ of the word $MM_j$ of the last packet PM transmitted by the subscriber installation $3_j$ and received free of transmission error by the switching exchange 1. In the case of the signal TC being in the state "0", the second input gate 3041 of the multiplexer 304 is selected by the signal S1, and the output port 3042 of multiplexer 304 issues the content of the second memory 302 byte by byte. The memory 302 then contains the data bits $Dm_1$ to $Dm_{72}$ of the word $MM_j$ of the last packet PM transmitted by the subscriber installation $3_j$ and received free of transmission error by the switching exchange 1, which packet is different, since TC="0", from the last packet transmitted towards the switching exchange 1 and of which the corresponding word $MM_j$ transmitted by the subscriber installation $3_j$ is memorized in the first memory 301.

At the end of reception of the word $MD^*_j$ by the decrypting circuit 30, the clock signals $H1_D$ and $H2_D$ respectively come into the states "0" and "1". The gates 307 and 308 are then respectively closed and open. In the case where the signal TC is in the state "1" and indicates that the last packet PM transmitted towards the switching exchange 1 has been received free of transmission error, the signal S2 supplied by the gate 308 is in the state "1", the buffer amplifier 306 is activated and the content of the first memory 301 is transferred at a fast rate into the second memory 302. In the memory 302 are thus saved the bits $Dm_1$ to $Dm_{72}$ of the word $MM_j$ of the last packet PM received free of transmission error by the switching exchange 1.

The EXCLUSIVE-OR gate circuit 305 is analogous to the circuit 105 included in the encrypting circuit 10. A first input port of the circuit 305 receives the octets of data bits $dd^*_1$ to $dd^*_{72}$ transmitted by the second output port 314 of the interface 31; a second input port of the circuit 305 receives the octets of data bits $Dm_1$ to $Dm_{72}$ transmitted by the multiplexer 304. The circuit 305 supplies the data bit octets $dd_1 = dd^*_1 \oplus Dm_1$ to $dd_{72} = dd^*_{72} \oplus Dm_{72}$. The backward word $MD_j$ comprised of the data bits $dd_1$ to $dd_{72}$ and of the control bits $gd_1$ to $gd_8$ is reconstructed and is issued by an output port of the decrypting circuit 30.

What I claim is:

1. A method for encrypting information in a communication system in which bidirectional multiplexed communications of the point-to-multipoint type are derived between a central station and plural terminal stations, said central station transmitting first multiplexed words respectively destined for said terminal stations, and said terminal stations respectively supplying second words which are multiplexed and transmitted towards said central station, said method comprising in said central station, detecting transmission errors in said second words thereby deriving transmission error informations and transmitting them towards said terminal stations, and encrypting first words respectively as a function of corresponding second words free of transmission error, previously received in said central station, and in said terminal stations, detecting said transmission error informations, memorizing temporarily said second words that are transmitted from said terminal stations and received free of transmission error, and decrypting said first words respectively received in said corresponding terminal stations as a function of the detected transmission error informations and the memorized second words.

2. A communication system with information encryption comprising a central station connected by transmission media to plural terminal stations and with which are derived bidirectional multiplexed communications of the point-to-multipoint type, said central station transmitting first multiplexed words respectively destined for said terminal stations, and said terminal stations respectively supplying second words which are multiplexed and transmitted towards said central station, said central station comprising means for detecting transmission errors in said second words received by said central station thereby deriving transmission error informations, means for memorizing temporarily the second words received free of transmission error, means for including said transmission error informations in the first words to be transmitted, and means for encrypting said first words to be transmitted as a function of said memorized second words, and each of said terminal stations comprising means for detecting said transmission error informations in said first words received by said terminal station, means for memorizing temporarily said second words transmitted by said terminal station and received free of transmission error by said central station, and means for decrypting said received first words as a function of the detected transmission error informations and the memorized second words.

3. The communication system as claimed in claim 2, wherein said crypting and decrypting means comprise logic gates of the EXCLUSIVE-OR type.

4. The communication system as claimed in claim 2, wherein said transmission media are of the optical fiber type and said system comprises a directional optical fiber coupler connected to optical ports of said central and terminal station via respective optical fibers.

5. The communication system as claimed in of claim 2, wherein said bidirectional multiplexed communications between said central station and said terminal stations are of the collective half-duplex type.

* * * * *